United States Patent [19]

Bischoff et al.

[11] Patent Number: 4,478,707
[45] Date of Patent: Oct. 23, 1984

[54] PROCESS FOR THE HYDROTREATMENT OF HYDROCARBONS IN AN EXPANDED OR EBULLATED CATALYST BED

[75] Inventors: Didier Bischoff; Gerard Courteheuse, both of Rueil Malmaison; Pierre Renard, Saint Nom la Breteche, all of France

[73] Assignee: Institut Francais du Petrole, Rueil-Malmaison, France

[21] Appl. No.: 512,050

[22] Filed: Jul. 8, 1983

[30] Foreign Application Priority Data

Jul. 9, 1982 [FR] France .............................. 82 12239

[51] Int. Cl.³ ...................... C10G 45/20; C10G 47/30; B01J 8/22
[52] U.S. Cl. .................................. 208/157; 208/153; 422/140; 422/143
[58] Field of Search ............... 208/108, 152, 153, 157, 208/163, 171, 213, 304, 146; 422/143, 140, 145

[56] References Cited

U.S. PATENT DOCUMENTS

| | | | |
|---|---|---|---|
| 3,053,642 | 9/1962 | Huntley et al. .................... | 422/143 |
| 3,207,689 | 9/1965 | Van Driesen et al. ............. | 208/152 |
| 3,309,305 | 3/1967 | Scott ................................... | 208/111 |
| 3,353,924 | 11/1967 | Riopelle ............................. | 23/288 |
| 3,410,792 | 11/1968 | Van Driesen et al. ............. | 208/157 |
| 3,441,498 | 4/1969 | Jubin, Jr. et al. .................. | 208/143 |
| 3,523,888 | 8/1970 | Stewart et al. ..................... | 208/157 |
| 3,556,736 | 1/1971 | Boyd .................................. | 23/288 |
| 3,761,393 | 9/1973 | Wolk et al. ........................ | 208/108 |
| 3,870,623 | 3/1975 | Johnson et al. ................... | 208/157 |
| 4,392,943 | 7/1983 | Euzen et al. ....................... | 208/171 |

FOREIGN PATENT DOCUMENTS

| | | |
|---|---|---|
| 1933857 | 1/1971 | Fed. Rep. of Germany . |
| 2014517 | 4/1970 | France . |
| 2069339 | 9/1971 | France . |
| 436226 | 11/1967 | Sweden . |
| 1309427 | 3/1970 | United Kingdom . |
| 1191220 | 5/1970 | United Kingdom . |

*Primary Examiner*—Delbert E. Gantz
*Assistant Examiner*—Lance Johnson
*Attorney, Agent, or Firm*—Millen & White

[57] ABSTRACT

The hydrotreatment of hydrocarbons in the liquid phase is effected in a column containing a catalyst bed supported by a grid, wherethrough passes an ascending stream of the charge admixed with hydrogen which expands the catalyst bed, the perforations of the grid being small enough to prevent passage of the catalyst particles but large enough to permit passage of the hydrogen-charge mixture, the reaction effluent being withdrawn from the top of the column.

13 Claims, 9 Drawing Figures

PROCESS FOR THE HYDROTREATMENT OF HYDROCARBONS IN AN EXPANDED OR EBULLATED CATALYST BED

BACKGROUND OF THE INVENTION

This invention concerns a process and apparatus for the treatment or hydrotreatment of a fluid charge and, more particularly, for the demetallation, desulfurization, hydrotreatment and conversion or hydroconversion of hydrocarbons.

The invention is particularly applicable to catalytic treatments of a liquid charge such, for example, as distillates issued from heavy crude oils, straight-run or vacuum residues of hydrocarbon distillation, these treatments being generally effected in the presence of hydrogen and/or gaseous mixtures of high hydrogen content, over a bed of solid catalyst, the catalyst being used as particles (catalyst extrudates, grains of various shapes, balls, etc.)

In such catalytic treatments, a quick deactivation of the catalyst is frequently observed as a result of the presence of catalyst poisons, of coke formation, of deposition of certain metals, etc.

This deactivation requires frequent replacements of a portion or of the whole catalyst bed.

In the process of the invention, the withdrawal of the catalyst from the reactor is generally effected periodically or sometimes continuously or at the end of the charge treatment.

The selected type of catalyst bed is that of a conventional ebullated or expanded bed, the expansion of the catalyst particles being obtained by the ascending flow of the gas and of at least one liquid which is generally the charge itself.

Beyond certain surface velocities of the gas and of the liquid, the catalyst bed, initially at rest, becomes expanded or dispersed and the catalyst, to which is imparted a permanent motion, circulates more or less quickly within the reactor. The present process is operated in such a manner as to obtain an expansion rate of about 10–30%, and for example 15%, by volume with respect to the bed at rest. A further description of the characteristics of the ebullated bed is needless, the latter being well-known in the art (see for example U.S. Pat. No. 2,987,465).

The process according to the invention and the apparatus according to the invention are also convenient for withdrawing catalyst particles from reactors used for cracking, hydrocracking, hydroreforming, aromatic hydrocarbons manufacture, isomerization of parraffinic, naphthenic or aromatic hydrocarbons, various reactions of hydrogenation, dehydrogenation, alkylation, transalkylation, hydrodecyclization, hydrodealkylation, hydrotreatment, hydrovisbreaking, etc., the liquid charge and the gas injected in these reactors progressing upwardly therethrough.

The fluid charge, which is a mixture of a liquid and a gas, is introduced into the reactor or into the enclosure containing catalyst particles, through distribution members located at the lower portion of the reactor or of the enclosure and circulates upwardly (upflow) before being discharged, after treatment of the charge, from the upper portion of the reactor (or of the enclosure which will be arbitrarily called "reactor" hereinafter).

The disadvantages resulting from the use of a downward circulation of the charge are known (in a technique of the moving bed type), the latter being discharged from the bottom of the reactor through a cylindrical grid located at the bottom of the reactor and which supports the catalyst bed. Such a process has the disadvantage of a risk of plugging the grid with catalyst grains pushed against said grid by the liquid material discharged from the bottom of the reactor. This may result in an uneven distribution of the fluids through the catalyst with liabilities of blocking certain zones of this bed during the catalyst discharge, as well as in an increase of the catalyst erosion due to the friction between the blocked grains and the free grains of the catalyst bed and between the free catalyst grains and the grid for discharging the liquid charge.

SUMMARY OF THE INVENTION

According to the invention, the use of the ebullated bed technique provides for an improvement in the distribution and in the homogenization of the catalyst bed, and makes easier the catalyst withdrawal.

The invention further provides a technique which avoids the abovementioned disadvantages while providing for a correct expansion of the ebullated bed.

This technique consists of injecting the liquid and the gases below the wall which supports the catalyst bed, through a plurality of orifices distributed over the whole reactor cross-section, in conformity with various arrangements which are the object of the invention.

More particularly, this result is obtained by a process wherein powdered solid particles are periodically withdrawn from a generally confined space and a fluid charge, consisting of a liquid and a gas (generally hydrogen), is introduced into said space, said generally confined space having substantially the shape of an elongate substantially vertical volume of revolution, the solid particles being introduced at the upper part of the enclosure and withdrawn periodically or at the end of the treatment from the lower part of the enclosure (after their use as expanded bed) whereas the fluid charge is introduced, at least partly and, for example, continuously, into the lower part of said enclosure and is withdrawn from the upper part thereof after having progressed upwardly through said enclosure, the solid particles in said process being accordingly periodically withdrawn from the lower end of the enclosure through at least one opening of convenient size for the discharge of the solid particles, provided through the lower wall of said enclosure, said wall being substantially horizontal and substantially and regularly discontinuous i.e., provided with at least several regularly spaced openings having each a sufficiently small size to prevent the solid particles from passing through said walls but of sufficient size to give access to an ascending stream of the fluid charge and of the hydrogen, the process being characterized in that the fluid charge is injected in the lower part of said enclosure through at least one distribution zone of a particular shape specific to the invention and located below said wall.

By way of example, a first type of distribution zone consists generally of a main duct which is, for example, substantially horizontal or vertical when penetrating inside the reactor, said duct being optionally sharply bended at least at one place, its end part then extending substantially vertically below the wall which supports the catalyst bed. This end part is then subdivided into a plurality of branches (or beams) arranged (toric distributor and tube network) for example radially in star configuration (with at least three branches or beams), each branch being provided with several judiciously located orifices (facing the wall or on the opposite side or on the sides of the branch) all along the branch and wherethrough the fluid is injected in mixed phase in order to produce the turbulences necessary for obtaining the expanded catalyst bed.

BRIEF DESCRIPTION OF THE DRAWINGS

The invention is illustrated by FIGS. 1-8 wherein:

FIGS. 1 and 1A diagrammatically show a first embodiment of the catalyst treatment device, with the use of an ebullated moving bed.

Reactor 1 comprises, at its upper part, means for introducing fresh catalyst (new or regenerated) diagrammatically shown as duct 2 which discharges the catalyst particles for feeding a catalyst bed 3.

The catalyst, periodically or at the end of the treatment, is discharged through line 4, diagrammatically shown at the lower part of reactor 1. The one or more valves required for this discharge are not shown in the figure. The catalyst, during the periods of operation of the reactor, is maintained in said reactor by a wall, which consists in the present case of a conventional grid 5 (arbitrarily called "wall" or "grid"). The holes such as 6, of grid 5, give passage to the liquid charge and the gases injected below the grid through a duct such as 7, but do not give passage to the catalyst particles.

Figure 1:
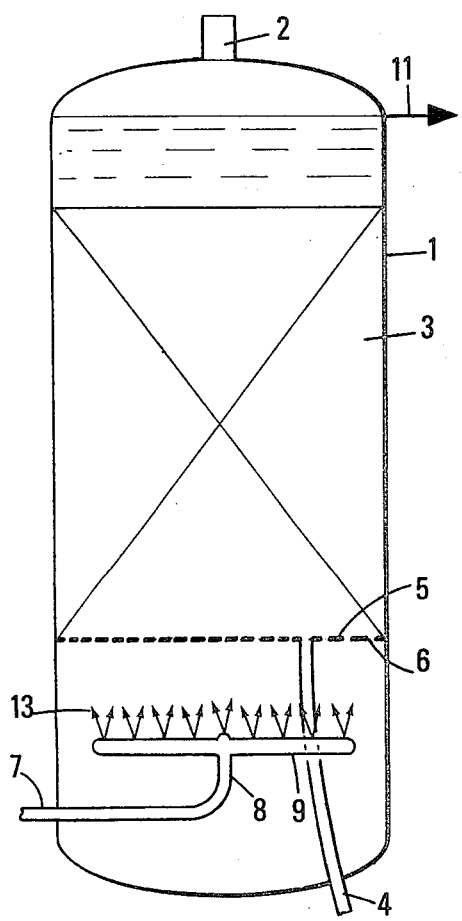
FIGS. 1 and 1A show, in axial cross-section and in transverse cross-section respectively, a first embodiment of the invention, with a single distributor of the so-called star-shaped type.
Figure 1A:
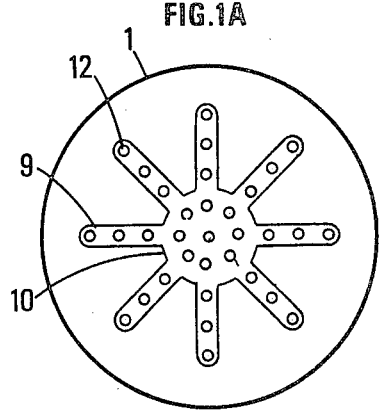

The fluid charge is accordingly introduced at the lower part of reactor 1 through at least one distribution zone comprising a distribution ramp 7 (horizontal, oblique or vertical or arranged in any convenient manner, for example vertical in certain industrial reactors) which feeds at least one vertical injection pipe 8 with radial tubular extensions (or branches) 9 in star-shape arrangement as shown in FIG. 1A, which is a transversal cross-section of reactor 1.

In FIG. 1A, each branch 9 of the star 10 is provided with orifices 12 (holes or slots or other perforations of the same type) for injecting the fluid charge inside the reaction zone.

The fluid charge, consisting of two phases (liquid and gas), progresses upwardly through the reactor before being discharged at the upper part of the reactor through collecting and discharging means diagrammatically shown as line 11 in FIG. 1, shaped, for example, as a rake formed of collecting tubes connected to a discharge duct.

In the case of FIG. 1, where the distributor (or distributors, when several of them are used), shown in FIG. 1 as the assembly of arrangements 7,8 and 9, has the shape of a substantially horizontal star, the various orifices such as 12 (see FIG. 1A) of the different branches 9 are judiciously calibrated and distributed (above, below, at the top and on the sides so as to provide the better dispersion of gas and liquid within a wide range of flow rates).

Figure 2:
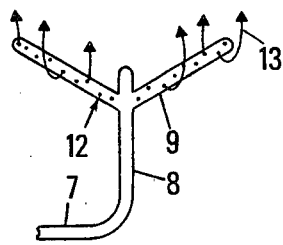
FIGS. 2 to 4, illustrate various other embodiments of the means for introducing the fluid charge, whose object is also to obtain a better gas-liquid dispersion.
Figure 3:
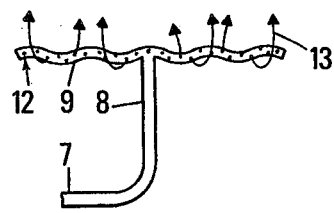
Figure 4:
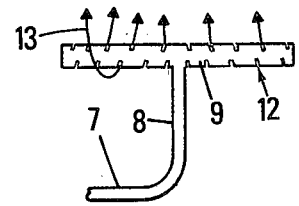

Other types of perforated distributors which can be used according to the present invention are shown in FIGS. 2 and 3. These two figures show a ramp 7, horizontal in this occurrence, at least one vertical end portion (or stick) 8 and branches 9 of various shapes. These branches (whose inclination may be comprised for example between 0° and 40° to the horizontal) have the shape either of a star with inclined branches as in FIG. 2 (shaped as the ribs of an overturned umbrella) or of a star with branches of undulated shape as in FIG. 3. FIG. 4 shows optional positions of orifices such as 12 on a branch 9 in order to spray in multiple directions (diagrammatically shown by arrows 13 on all the FIGS. 1, 1A, 2, 3 and 4) the fluid droplets so as to introduce them within the catalyst mass homogeneously at any point of the surface of grid 5, through openings 6 of FIG. 1.

The stars of the distributors may comprise 3, 4, 5, 6, 7, 8 etc. or more, branches or beams.

Figure 5:
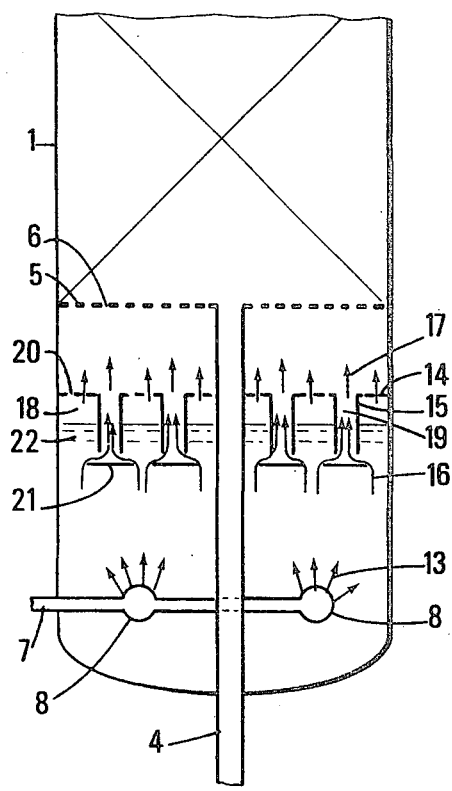
FIG. 5 shows an axial cross-section of another embodiment of the invention wherein additional mixing and dispersing elements for the fluid charge are illustrated.

Another improvement of the process is characterized as follows:

The mixed fluid injected through a distribution zone (star-shaped or not) is oriented towards the wall which supports the catalyst bed where it first encounters, before reaching this wall, a space (18) (FIG. 5) whose upper part is provided with orifices sufficiently large to give passage to the major part of the gaseous phase of the mixed fluid but sufficiently narrow to prevent the passage of the major part of the liquid phase of the mixed fluid, said space being traversed by vertical walls which define openings through said space, so that the mixed fluid, inside said space, is divided into, on the one hand, a gaseous phase and, on the other hand, a liquid phase, the major part of the gaseous phase reaching said wall through said orifices of said upper part of the space, the major portion of the liquid phase reaching the wall after having progressed through said openings defined by said walls passing through said space, and after being again admixed (above said orifices of said upper part of the space) with the major part of the gaseous phase in order to produce a turbulence adapted to expand the catalyst bed and to provide for a better dispersion of the gas and the liquid within a large range of flow rates.

The corresponding improvement of the apparatus, as explained below, provides for a still more regular dispersion of the fluid within a wider range of flow rates through the catalyst bed while ensuring a better "bubbling" within the catalyst bed. This improvement, illustrated in FIG. 5, consists of placing into the reactor 1, between the grid 5 supporting the ebullated bed (catalyst withdrawal through duct 4), and ramps such as 7, distribution zones, star-shaped or not (diagrammatically shown as discs 8), an additional grid 14 (or any other equivalent means ) whose perforations 20 are sufficiently small to prevent passge of the major part of the fluid liquid phase (introduced through the distribution zones 8), while giving passage to the major part of the fluid gaseous phase. Continuous (i.e. unperforated) walls or barriers 15, substantially vertical, forming chimneys for example, are arranged, as a general rule, regularly under said grid 14 and take their bearing on said grid 14, the lower ends being at a sufficient low level within the reactor, generally above that of the distribution zones (8) thus defining a compartment 18 and chimneys 19: a major part (arrow 17) of the fluid gaseous fraction reaches the grid 5 through compartment 18 and orifices 20 after passage through zones 22 and 18 of accumulation and separation of a liquid phase and a gaseous phase. Plates or baffles 21 are placed below the lower ends of the chimneys 19 (and above the level of the distribution boxes) so that the mixed fluid injected through the distribution zones 8 whose path is indicated by arrows 13, accumulates into compartments 18 while generating liquid and gaseous clusters 22, the major part of the liquid being swallowed up through chimneys 19 (path identified by arrows 16). The above-described improved apparatus is thus used as a mixer and disperser of the fluid charge.

Figure 6:
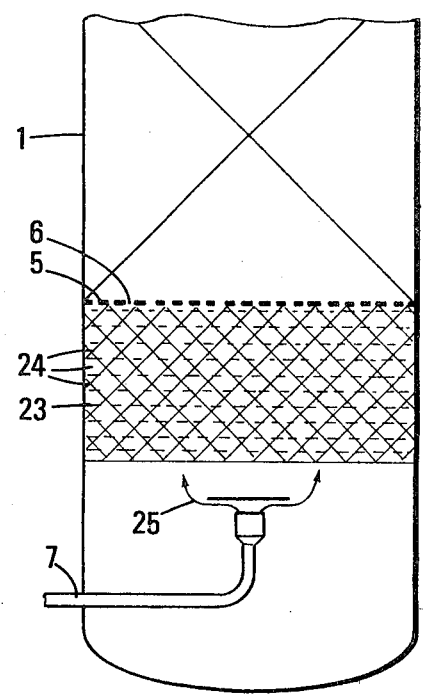
FIG. 6 shows an axial cross-section of yet another embodiment of the invention wherein a cellular element is used to effect mixing and dispersion of the charge.

Another improvement of the process and of the apparatus conforming with the invention, and adapted for use as mixer of the fluid charge, is illustrated in FIG. 6 (in this figure, the catalyst withdrawal line 4 is not shown).

This process consists of causing the mixed fluid, injected through a distribution zone of, for example, star shape, to flow through a plurality of cellular layers, juxtaposed to one another and placed between the one or more distribution zones and the substantially horizontal wall supporting the catalyst bed, in order to produce the regular and homogeneous expansion of the catalyst bed and to provide for a better dispersion of the gas and of the liquid within a large range of flow rates.

Figure 7:
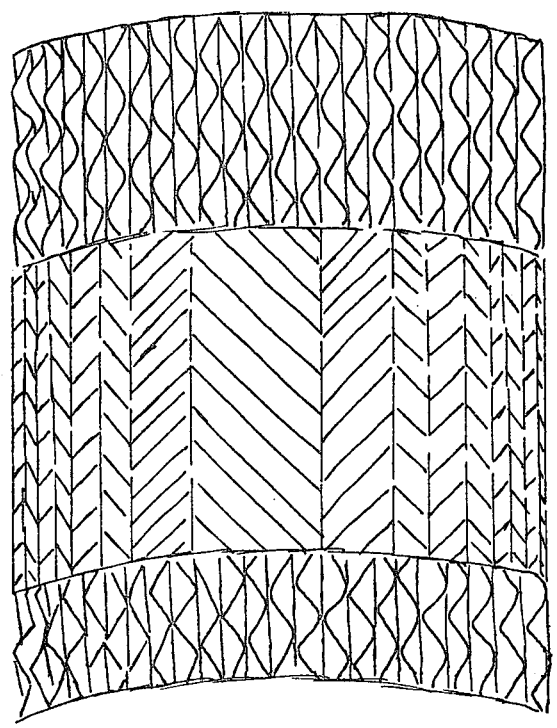
FIG. 7 illustrate a plate which can be used as a component of the cellular element of FIG. 6.
Figure 8:
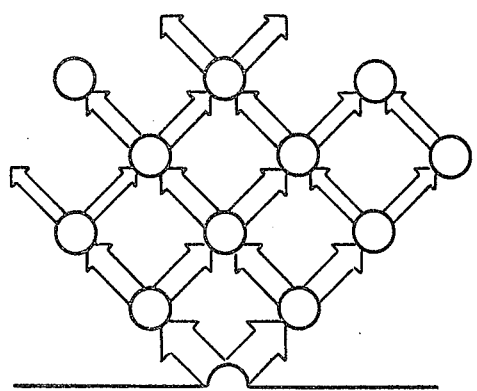
FIG. 8 diagrammatically illustrates fluid pathways which can be achieved with plates such as that shown in FIG. 7.

With reference to FIG. 6, the injected fluid is circulated through reactor 1 towards grid 5 and its perforations 6, through a distribution box 7, either star-shaped or not (and, for example, in the form of "break-jet" i.e. of an injection duct having a plurality of orifices and surmounted with a plate which breaks the jet to rain, as indicated by arrows 25) through the cells of a kind of waffle-iron 23, itself constituted of a series of elements 24 shaped as plates or cellular layers of various shapes (cylindrical or square, etc. for example) depending on the geometry of the reactor and pressed against one another. Generally each element has the shape of a rough or ribbed or corrugated plate comprising ribs (as shown in FIG. 7); the plates, either identical or different, are so arranged as to create complex and continuous paths (illustrated in FIG. 8) from the lower part to the upper part, whereby the mixed fluid can raise to the upper part through multiple orifices and thus have access to the catalyst bed, through grid 5, while ensuring a correct mixing of the gas-liquid charge, hence a steady bubbling within the catalyst bed at any point thereof. In each element, as shown in FIG. 8, each fluid path or passage way is subdivided several times into two new paths, each of these new paths being again subdivided into other fluid passage ways.

The plates, whose general aspect can be seen on FIG. 7, are made of a metal or alloy or of any adequate plastic material. They are available in the trade (e.g. "SULZER").

The process and the apparatus according to the invention, as described above, may also be provided, in order to control the reaction exothermicity in the ebullated bed, with quenches or coolings, generally fed with cold hydrogen and/or a judiciously selected liquid (for example a liquid of the same kind as the liquid charge), for example at the input or the output of the reaction zone but also in the middle of the catalyst bed itself and, in the latter case, it appears judicious to inject the fluid used to perform such a quench (for example cold hydrogen or a cold liquid), through at least one distribution zone of star-shaped type as above described in relation with FIGS. 1 to 4 or shaped as lozenges or cylinders, judiciously spaced so as to increase the turbulence and hence the efficiency of the quench between said lozenged or cylindrical distributors. Any other shape not hindering the catalyst motion can also be used.

What is claimed is:

1. In a process for the hydrotreatment, hydrovisbreaking or hydroconversion of hydrocarbons, wherein a liquid hydrocarbon charge and a hydrogen-containing gas are contacted with a solid catalyst, in a reaction zone having substantially the shape of an elongate, substantially vertical volume of revolution, containing the catalyst and having a perforated wall at its lower end which supports the catalyst bed, at least a part of the liquid charge and the hydrogen-containing gas being introduced into the lower part of the reaction zone below said perforated wall, the liquid and gaseous effluent being withdrawn at the upper part of the reaction zone after passage upwardly therethrough, the catalyst particles being introduced at the upper part of the reaction zone and being withdrawn periodically or at the end of the charge treatment from the lower part of the reaction zone through at least one opening provided in said perforated supporting wall, said opening being sufficiently large to permit discharge therethrough of catalyst particles, said perforated supporting wall being provided with a plurality of spaced perforations whose size is sufficiently small to prevent catalyst particles from passing therethrough but sufficiently large to permit upward passage therethrough of fluid charge and hydrogen, the improvment wherein said catalyst is in the form of an expanded or ebullated bed, the expansion and/or ebullition thereof being maintained by the passage therethrough of a fluid mixture of charge and hydrogen-containing gas, the liquid charge and hydrogen-containing gas being injected as a fluid mixture, at least a portion of which is injected into the lower part of said reaction zone through at least one distribution zone located below said perforated support wall, said wall being substantially horizontal, each said distribution zone comprising a distribution ramp terminating in a substantially vertical injection pipe and feeding a plurality of radial branches in a star-shaped array, each branch being provided with a plurality of orifices wherethrough a portion of said fluid mixture is injected into said reaction zone.

2. A process according to claim 1, wherein the reaction zone is of elongate cylindrical shape.

3. A process according to claim 1, wherein the branches in star-shaped array are substantially horizontal.

4. A process according to claim 1, wherein said branches are inclined by an inclination angle of between 0° and 40° to a horizontal line.

5. A process according to claim 1, wherein said branches are of undulated shape.

6. A process according to claim 1, wherein the catalyst bed is expanded by about 10-30% by volume with respect to the resting volume of the bed.

7. In a process for the hydrotreatment, hydrovisbreaking or hydroconversion of hydrocarbons, wherein a liquid hydrocarbon charge and a hydrogen-containing gas are contacted with a solid catalyst, in a reaction zone having substantially the shape of an elongate, substantially vertical volume of revolution, containing the catalyst and having a perforated wall at its lower end which supports the catalyst bed, at least a part of the liquid charge and the hydrogen-containing gas being introduced into the lower part of the reaction zone below said perforated wall, the liquid and gaseous effluent being withdrawn at the upper part of the reaction zone after passage upwardly therethrough, the catalyst particles being introduced at the upper part of the reaction zone and being withdrawn periodically or at the end of the charge treatment from the lower part of the reaction zone through at least one opening provided in said perforated supporting wall, said opening being sufficiently large to permit discharge therethrough of catalyst particles, said perforated supporting wall being provided with a plurality of spaced perforations whose size is sufficiently small to prevent catalyst particles from passing therethrough but sufficiently large or permit upward passage therethrough of fluid charge and hydrogen, the improvement wherein said catalyst is in the form of an expanded or ebullated bed, the expansion and/or ebullition thereof being maintained by the passage therethrough of a fluid mixture of charge and hydrogen-containing gas, the liquid charge and hydrogen-containing gas being injected as a fluid mixture, at least a portion of which is injected into the lower part of said reaction zone through at least one distribution zone located below said perforated support wall, said wall being substantially horizontal, said fluid mixture being directed towards said support wall; and wherein a turbulent mixing means is disposed between said distribution zone and said support wall, comprising as its upper component a perforated horizontal plate having a plurality of orifices therein sufficiently large to permit passage therethrough of the major part of the gaseous phase of said fluid mixture but sufficiently narrow to prevent passage therethrough of the major part of the liquid phase of said fluid mixture, said plate having a plurality of spaced openings therein, from each of which extends downwardly a substantially vertical chimney; whereby the injected fluid mixture accumulates in the space beneath said plate and around said chimneys and generates liquid and gaseous clusters, the major part of the gaseous phase passing through said orifices, and the major part of the liquid phase being pushed up through said chimneys and through the openings in said plate, the liquid and gaseous phases being admixed above said plate to produce a turbulent fluid mixture which enters said reaction zone and expands and/or ebullates said catalyst.

8. A process according to claim 7, wherein the reaction zone is of elongate cylindrical shape.

9. A process according to claim 7, wherein the catalyst bed is expanded by about 10–30% by volume with respect to the resting volume of the bed.

10. In a process for the hydrotreatment, hydrovisbreaking or hydroconversion of hydrocarbons, wherein a liquid hydrocarbon charge and a hydrogen-containing gas are contacted with a solid catalyst, in a reaction zone having substantially the shape of an elongate, substantially vertical volume of revolution, containing the catalyst and having a perforated wall at its lower end which supports the catalyst bed, at least a part of the liquid charge and the hydrogen-containing gas being introduced into the lower part of the reaction zone below said perforated wall, the liquid and gaseous effluent being withdrawn at the upper part of the reaction zone after passage upwardly therethrough, the catalyst particles being introduced at the upper part of the reaction zone and being withdrawn periodically or at the end of the charge treatment from the lower part of the reaction zone through at least one opening provided in said perforated supporting wall, said opening being sufficiently large to permit discharge therethrough of catalyst particles, said perforated supporting wall being provided with a plurality of spaced perforations whose size is sufficiently small to prevent catalyst particles from passing therethrough but sufficiently large to permit upward passage therethrough of fluid charge and hydrogen, the improvement wherein said catalyst is in the form of an expanded or ebullated bed, the expansion and/or ebullition thereof being maintained by the passage therethrough of a fluid mixture of charge and hydrogen-containing gas, the liquid charge and hydrogen-containing gas being injected as a fluid mixture, at least a portion of which is injected into the lower part of said reaction zone through at least one distribution zone located below said perforated support wall, said wall being substantially horizontal, said fluid mixture being directed toward said support wall; and wherein a plurality of juxtaposed cellular layers is disposed between said distribution zone and said support wall, said cellular layers providing a plurality of divided passages therethrough; whereby said fluid mixture passes through said passages and into said reaction zone to produce a regular and homogeneous expansion and/or ebullition of said catalyst.

11. A process according to claim 10, wherein the reaction zone is of elongate cylindrical shape.

12. A process according to claim 10, wherein said distribution zone comprises break-jet means to provide a spray of fluid to said cellular layers.

13. A process according to claim 10, wherein the catalyst bed is expanded by about 10–30% by volume with respect to the resting volume of the bed.

* * * * *